United States Patent [19]

Segawa et al.

[11] Patent Number: 4,833,016
[45] Date of Patent: May 23, 1989

[54] COMPOSITE VEHICLE-INTERIOR FINISH MATERIAL

[75] Inventors: Susumu Segawa; Toshikazu Tomizawa, both of Iwaki, Japan

[73] Assignee: Kureha Kagaku Kogyo K. K., Japan

[21] Appl. No.: 184,255

[22] Filed: Apr. 21, 1988

[30] Foreign Application Priority Data

Apr. 24, 1987 [JP] Japan ............................ 62-061372[U]

[51] Int. Cl.⁴ ............................ B32B 3/26; B32B 7/12; B32B 27/30
[52] U.S. Cl. .................... 428/317.1; 428/159; 428/160; 428/317.7; 428/319.7; 428/473; 428/522
[58] Field of Search .................... 428/159, 160, 317.1, 428/317.7, 319.7, 473, 522

[56] References Cited

U.S. PATENT DOCUMENTS 3,862,870 1/1975 Suda et al. ........................ 428/319.7

FOREIGN PATENT DOCUMENTS 51-41910 11/1976 Japan .
61-40526 11/1986 Japan .

Primary Examiner—William J. Van Balen
Attorney, Agent, or Firm—Lowe, Price, LeBlanc, Becker & Shur

[57] ABSTRACT

A composite vehicle-interior finish material having high adhesive strength and excellent heat resistance is composed of three layers, namely, a first layer formed of a polyvinyl chloride sheet or leather, a second layer formed by impregnated and coating a soft foam with a vinylidene chloride-based copolymer latex composed of 64–95 wt. % of vinylidene chloride monomer, 4–35 wt. % of at least one vinyl monomer other than vinylidene chloride monomer and 1–10 wt. % of an unsaturated organic acid monomer and then drying the soft foam, and a third layer formed by coating a base material with the vinylidene chloride-based copolymer latex and then drying the base material. These three layers have been bonded together by high-frequency welding.

4 Claims, 1 Drawing Sheet

COMPOSITE VEHICLE-INTERIOR FINISH MATERIAL

FIELD OF THE INVENTION

This invention relates to a composite vehicle-interior finish material having excellent heat resistance and permanent compression set resistance and high inter-layer adhesive strength, and more specifically to a composite vehicle-interior finish material obtained by laminating as first, second and third layers a polyvinyl chloride sheet or the like, a soft foam impregnated or coated with a special copolymer resin latex and a base material, such as hard board, coated with the latex and then subjecting them to high-frequency welding.

BACKGROUND OF THE INVENTION

Composite materials produced by bonding a sheet-like material such as polyvinyl chloride sheet or leather as a skin on a base material such as hard board or fiber board by high-frequency welding via a core, which has been obtained by impregnating a soft foam such as urethane foam, a non-woven fabric of a synthetic resin or the like with a vinylidene chloride-based copolymer latex and then drying them, have conventionally been used as vehicle-interior finish materials, for example, as automobile door trims, ceiling and the like (Japanese Patent Publication No. 41910/1976; Japanese Utility Model Publication No. 40526/1986).

In recent years, there is however an ever-increasing market demand for automobile parts, components and the like of still higher quality with a view toward making further improvements in various performance and durability. Of these, vehicle-interior finish materials are required to meet an especially stringent standard for heat resistance so that the bonding between each adjacent layers should be strong and heat-resistant. An accelerated testing method which is more severe than the conditions of a conventional evaluation test has already been introduced. Reflecting these requirements, there is an outstanding demand for further improvements in both materials to be used and performance. The conventional composite vehicle-interior finish materials are however still insufficient in heat resistance, adhesive strength and the like in view of the quality standard required in the market.

OBJECT AND SUMMARY OF THE INVENTION

An object of this invention is to provide a composite vehicle-interior finish material having excellent heat resistance and permanent compression set resistance as well as high inter-layer adhesive strength.

The present inventors have carried out an extensive investigation with a view toward providing a composite vehicle-interior finish material capable of satisfying the aforementioned market demand fully. As a result, it has been found that a triple-layer interior finish material having superb heat resistance and high inter-layer adhesive strength can be obtained by laminating as first, second and third layers a polyvinyl chloride sheet or the like, a soft foam impregnated or coated with a special copolymer resin latex and a hard board or the like coated with the latex and then bonding them together in accordance with high-frequency welding. Based on this finding, the present invention has now been completed.

In one aspect of this invention, there is thus provided a composite vehicle-interior finish material having high adhesive strength and excellent heat resistance, comprising the following three layers:

(A) a first layer formed of a polyvinyl chloride sheet or leather;

(B) a second layer formed by impregnating or coating a soft foam with a vinylidene chloride-based copolymer latex composed of 64-95 wt. % of vinylidene chloride monomer, 4-35 wt. % of at least one vinyl monomer other than vinylidene chloride monomer and 1-10 wt. % of an unsaturated organic acid monomer and then drying the soft foam; and (C) a third layer formed by coating a base material with the vinylidene chloride-based copolymer latex and then drying the base material; and said first, second and third layers having been bonded together by high-frequency welding.

In the present invention, the vinylidene chloride-based copolymer latex containing the vinylidene chloride monomer in an amount as much as 64-95 wt. % and also the unsaturated organic acid monomer as a copolymerizable component is used not only to impregnate or coat the soft foam but also to coat the base material. After its drying, high-frequency welding is performed. The adhesive strength between each of the adjacent layers is hence extremely high so that the peel strength is not reduced and no separated spot is formed at welds even when subjected to a severe heat resistance test.

DETAILED DESCRIPTION OF THE INVENTION

Figure 1:
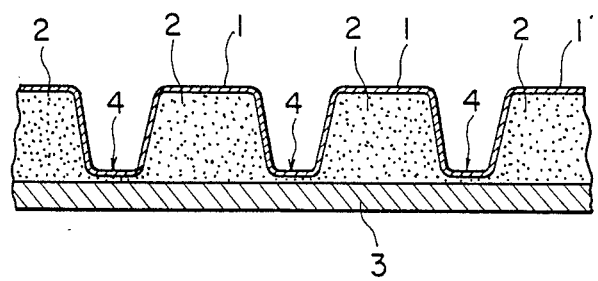
FIG. 1 is a fragmentary cross-sectional view showing one example of the composite vehicle-interior finish material according to the present invention.

The essential elements of this invention will hereinafter be described in detail.

(Vinylidene chloride-based copolymer latex)

The vinylidene chloride-based copolymer latex, which is useful in impregnating or coating a soft foam and also in coating a base material in the present invention, can be obtained by copolymerizing 64-95 wt. % of a vinylidene chloride monomer, 4-35 wt. % of at least one vinyl monomer other than the vinylidene chloride monomer and 1-10 wt. % of an unsaturated organic acid monomer in the presence of a conventional emulsifier, a catalyst, a stabilizer and the like in water.

In order to impart soft appearance, film-forming property, incombustibility, high-frequency weldability and heat resistance, the content of the vinylidene chloride monomer in the copolymer is 64-95 wt. %, preferably 70-92 wt. %. If the content of the vinylidene chloride monomer falls outside the above range, the aforementioned properties will be impaired. Especially, any content smaller than 64 wt. % will result in a impregnated or coated soft foam having a greater permanent compression set. Such a soft foam will be unable to give soft feeling to the touch, so that only a composite vehicle-interior finish material of inferior commercial value will be available. In general, the permanent compression set may preferably be within three times compared with that of the same soft foam before its latex treatment.

The term "vinyl monomer other than vinylidene chloride monomer" means a monomer containing one or more vinyl groups and excludes vinylidene chloride monomer. Illustrative examples of the vinyl monomer other than vinylidene chloride monomer may include vinyl chloride; the vinyl esters of fatty acids such as vinyl acetate and vinyl propionate; acrylic monomers such as acrylic esters, methacrylic esters, acrylamide, methacrylamide, acrylonitrile and methacrylonitrile; etc. These vinyl monomers may be used either singly or in combination. The content of the vinyl monomer component is 4–35 wt. %, preferably, 8–25 wt. %. One or more of these vinyl monomers may be suitably chosen for use in the present invention depending on each requirement such as polymerization reactivity or heat resistance. Acrylic monomers are particularly preferred for the improvement of heat resistance.

As the unsaturated organic acid monomer, may be employed a compound having at least one free carboxyl group or acid anhydride group, i.e., an unsaturated organic acid or its derivative such as maleic acid, maleic anhydride, fumaric acid, itaconic acid or a half ester thereof, acrylic acid, or methacrylic acid. The proportion of the unsaturated organic acid monomer in the vinylidene chloride-based copolymer is 1–10 wt. %, preferably 2–8 wt. % of the monomer mixture. This unsaturated organic acid monomer takes an important role as a component for imparting wetting and bonding properties between the third layer of the base material and the second layer of the soft foam and between the second layer of the soft foam and the first layer of the polyvinyl chloride sheet or the like. Any proportions of the unsaturated organic acid monomer smaller than 1 wt. % will be unable to impart excellent wetting and bonding properties. Any proportions greater than 10 wt. % will however impair the polymerization reactivity. It is hence not preferable to use the unsaturated organic acid monomer in any proportions outside the above range.

The vinylidene chloride-based copolymer latex useful in the practice of this invention can be obtained by combining the above monomers and then copolymerizing them by a usual emulsion polymerization method.

The obtained latex is generally used in a resin concentration of 40–60 wt. % in terms of solids.

(Latex impregnation and coating)

The soft foam is impregnated or coated with the vinylidene chloride-based copolymer latex, while the base material is coated with the same latex. After that, they are dried. In the case of the impregnation, it is preferable to dip the soft foam in the latex so as to impregnate the former with the latter. In the case of the coating, it is preferable to coat the soft foam or the base material by a method employed widely in the art, for example, by roll coating or spray coating. After the impregnation or coating, water is caused to evaporate by a suitable method, for example, by allowing the impregnated or coated soft foam and the coated base material to stand at room temperature or by drying them with hot air so that water is evaporated. The latex may be used preferably at a rate of 10–30 g-resin per liter of the soft foam upon impregnation or coating of the soft foam and at a rate of 50–200 g-resin per m$^2$ of the base material upon coating of the base material. If the latex impregnated or coated is too little, it is impossible to achieve the purpose of its use, namely, improved bonding property. On the other hand, any unduly large amount leads to an economical loss.

The latex to be used to coat the base material may be either the same as or different from that to be employed to impregnate or coat the soft foam.

(Laminate structure)

The composite material of this invention has a layered structure such that the polyvinyl chloride sheet or leather, the soft foam obtained by impregnating or coating same with the vinylidene chloride-based copolymer latex and then drying it, and the base material, such as a board, obtained by coating same with the latex and then drying it are laminated successively as first, second and third layers. By applying high-frequency welding to the laminate of these three layers subsequent to their lamination, a composite material of such a shape as illustrated by way of example in FIG. 1 may be obtained.

FIG. 1 is a fragmentary cross-sectional view illustrating one example of the composite vehicle-interior finish material according to the present invention, in which there are shown a polyvinyl chloride sheet or leather layer 1, a soft foam layer 2, a base material layer 3 such as hard board, and welds 4.

The high-frequency welding is performed by a usual method. Regarding the thicknesses of the individual layers, the composite material may be used suitably in general so long as the thicknesses of the first, second and third layers are 0.5–3 mm, 1–10 mm and 1–4 mm respectively.

The soft foam may be a general soft plastic foam, for example, soft polyurethane foam, soft polyvinyl chloride foam or rubber foam.

As the base material, a hard board, fiber board or the like may be used suitably in the present invention.

Different from the mere impregnation or coating of a soft foam with a latex as in the invention described in Japanese Patent Publication No. 41910/1976, the present invention additionally includes the coating of a base material with a specific vinylidene chloride-based copolymer latex containing organic acid groups, the drying of them and the subsequent high-frequency welding. The bonding properties of both soft foam and base material have hence been improved significantly, thereby making it possible to provide a composite vehicle-interior finish material which can meet the standard of the heat resistance requirement in recent years.

ADVANTAGES OF THE INVENTION

The copolymer latex employed in the present invention contains vinylidene chloride in a proportion of 64 wt. % or higher and also includes the unsaturated organic acid monomer as an essential component. The resultant composite interior finish material is therefore excellent in heat resistance, incombustibility and high-frequency weldability, has a small permanent compression set and gives soft appearance. In the present invention, the soft foam is impregnated or coated with the vinylidene chloride- based copolymer latex and the base material is also coated with a specific latex. After their drying, high-frequency welding is applied. Accordingly, the resultant composite material has extremely high adhesive strength, and even when subjected to a severe heat resistance test, its peel strength is not reduced and no separated spot is formed at the welds. The present invention can therefore provide excellent composite vehicle-interior finish materials.

EMBODIMENTS OF THE INVENTION

The present invention will hereinafter be described in more detail by the following Examples and Comparative Examples. It should however be borne in mind that this invention is not necessarily limited to or by the following Examples.

Example 1 & Comparative Example 1

Soft foams, which were urethane foams having a thickness of 2 mm, were dipped separately in copolymer latexes of the below-described compositions so as to impregnate the soft foams with 20 g-resin/l of the corresponding vinylidene chloride-based copolymer, followed by drying for 3 minutes in a Geer's oven of 110° C. The proportions of the individual monomers are by weight, and the resin concentration of each latex was 50 wt. %.

Latex Nos. (1)–(7)

(1) Vinylidene chloride/vinyl chloride=60/40.
(2) Vinylidene chloride/vinyl chloride/acrylic acid=60/40/3.
(3) Vinylidene chloride/vinyl chloride/acrylic acid=75/25/3.
(4) Vinylidene chloride/methyl acrylate/monomethyl maleate=85/15/3.
(5) Vinylidene chloride/methyl acrylate/acrylic acid=88/12/3.
(6) Vinylidene chloride/methyl acrylate/octyl acrylate/acrylic acid=92/4/4/3.
(7) Vinylidene chloride/methyl acrylate/acrylic acid=75/25/3.

Following JIS K-6382, the thus-impregnated urethane foams were fixed under 50% compression and heated at 70°±2° C. for 2 hours. Thereafter, their loads were removed and the foams were left at 70°±2° C. for 2 hours. They were then left at room temperature for further 1 hour and the permanent compression set of each foam was measured. Results are shown in Table 1.

TABLE 1

|  |  | Latex used to impregnate soft foam (Latex No.) | Permanent compression set (%) |
|---|---|---|---|
|  |  | Not used | 10 |
| Comp. Ex. | 1-1 | Latex (1) | 40 |
|  | 1-2 | Latex (2) | 40 |
| Example | 1-1 | Latex (3) | 30 |
|  | 1-2 | Latex (4) | 22 |
|  | 1-3 | Latex (5) | 20 |
|  | 1-4 | Latex (6) | 15 |
|  | 1-5 | Latex (7) | 28 |

As appreciated from Table 1, the use of Latexes (1) and (2) outside the scope of the present invention resulted in composite materials, which had a large permanent compression set and failed to give soft feeling and touch. The composite materials therefore had an inferior commercial value and were unsuitable for practical use.

Example 2 & Comparative Example 2

Latex impregnation and coating were carried out in the same manner as in Example 1. Namely, a urethane foam of 2 mm thick was dipped in Latex (6) to impregnate the urethane foam with 20 g-resin/l of the vinylidene chloride-based copolymer.

Further, latexes shown in Table 2 were separately applied to the mesh sides of hard boards (product of Nippon Hardboard Co., Ltd.) of 2.2 mm thick by a manual rubber roll. The thus-coated hard boards were dried at room temperature for 48 hours. In each hard board, the coat weight was controlled at 150 g-resin/$m^2$. Polyvinyl chloride sheets of 0.5 mm thick were also provided. Composite materials were then fabricated using these three types of materials. Namely, each polyvinyl chloride sheet, urethane foam and hard board were laminated as first, second and third layers respectively, and were then subjected to high-frequency welding. Employed as a welder was "Model R-203DAIH" manufactured by Pearl Industries, Inc. (three phase, 200 V; maximum frequency output: 3 KW; oscillation frequency: 40.46 MHz; embossing air cylinder diameter: 125 mm). The welding was performed under the following conditions. Embossing air cylinder pressure: 4 Kgf/$cm^2$ (18.9 Kgf/$cm^2$ in terms of welder die pressure). Oscillation: 5 seconds. Cooling: 6 seconds. Anode current: 0.40 A. A heat resistant test was conducted on the resultant composite materials while varying the temperature and time. Their peel strengths (Kg/25 mm; sample width: 25 mm) were thereafter measured at a tension speed of 200 mm/min and temperature of 23°±1° C. by means of a tension testing machine.

Results of the heat resistance test are shown in Table 2. In the heat resistance test, welds were also observed visually to determine the degree of separation developed there.

From the results of the heat resistance test, it has been found, especially, in view of the recent standard for heat resistance that the ranges of 64–95 wt. % and 4–35 wt. % are preferred respectively as the vinylidene chloride content and the content of the vinyl monomer other than vinylidene chloride. It is also appreciated that the inclusion of an acrylic monomer as the vinyl monomer other than vinylidene chloride gives a high heat resistance level and is hence preferred.

TABLE 2

(Heat Resistance Test)

| | Board coating | | Conditions of heat resistance test | | | | |
|---|---|---|---|---|---|---|---|
| | | Kind of latex coated | 63° C. × 48 hr (after cooling for 60 min. subsequent to taking out of oven) | 80° C. × 48 hr (after cooling for 60 min. subsequent to taking out of oven) | 120° C. × 30 min. (60 min. cooling - 3 cycles) | 90° C. × 4 hr (after cooling for 60 min. subsequent to taking out of oven) | 120° C. × 1 hr (60 min. cooling - 3 cycles) |
| Comp. Ex. 2-1 | Not coated | — | ⊙ (0.8) | XX | XX | | |
| Comp. Ex. 2-2 | Coated | Latex (1) | ⊙ (2.0) | XX | XX | | |
| Comp. Ex. 2-3 | Coated | Latex (2) | ⊙ (2.5) | Δ (1.3) | X | | |
| Example 2-1 | Coated | Latex (3) | ⊙ (2.6) | ⊙ (2.0) | ⊙ (1.5) | Δ (0.8) | XX |
| Example 2-2 | Coated | Latex (4) | ⊙ (3.0) | ⊙ (2.6) | ⊙ (1.8) | ⊙ (2.1) | ⊙ (1.4) |
| Example | Coated | Latex (6) | ⊙ | ⊙ | ⊙ | ⊙ | ⊙ |

TABLE 2-continued (Heat Resistance Test)

| | Board coating | | 63° C. × 48 hr (after cooling for 60 min. subsequent to taking out of oven) | 80° C. × 48 hr (after cooling for 60 min. subsequent to taking out of oven) | 120° C. × 30 min. (60 min. cooling - 3 cycles) | 90° C. × 4 hr (after cooling for 60 min. subsequent to taking out of oven) | 120° C. × 1 hr (60 min. cooling - 3 cycles) |
|---|---|---|---|---|---|---|---|
| | | Kind of latex coated | | | | | |
| 2-3 | | | (3.5) | (3.2) | (2.8) | (3.0) | (2.2) |
| Example 2-4 | Coated | Latex (7) | ⊚ (2.8) | ⊚ (2.2) | ⊚ (1.7) | ○ (1.3) | X (0.5) |

In the Table, each value indicates peel strength (Kg/25 mm).
Heat resistance test (visual):
⊚: Absolutely no separated spot.
○: No separated spot but some parts of the weld (edge) were deformed.
Δ: Development of some separated spots (at 2 mm clearance parts, posed no practical problem.)
X: Separated spots less than 30% of the welded area.
XX: Separated spots of 30% or more of the weld area.

Example 3 & Comparative Example 3

The following experiment was conducted to investigate the effects of an unsaturated organic acid monomer on the adhesive strength at varied content levels. Namely, composite materials were separately fabricated in the same manner as in Example 2 except that various copolymer latexes, which were composed of 85 parts by weight of vinylidene chloride, 15 parts by weight of methyl acrylate and 0.5-8 parts by weight of acrylic acid, were used separately for the coating of hard boards (products of Nippon Hardboard Co., Ltd.) and the anode current of high-frequency welding was changed in three levels, that is, was set at 0.35, 0.40 and 0.45 A (see Table 3).

As condition for a heat resistance test, was chosen 90° C.×4 hours. After the test, welds were observed visually to determine the degree of separation developed there. Results are also shown in Table 3.

As apparent from the results given in Table 3, strong bonding free of separation can be obtained even at a relatively low anode current level so long as the proportion of acrylic acid falls within the range specified in the present invention.

TABLE 3

Effects of Unsaturated Organic Acid Monomer Content on High-Frequency Weldability.

| | Composition of copolymer (wt. parts) | | | High-frequency conditions (anode current) | | |
|---|---|---|---|---|---|---|
| | Vinylidene chloride | Methyl acrylate | Acrylic acid | 0.35 A (low) | 0.40 A (medium) | 0.45 A (high) |
| Comp. Ex. 3-1 | 85 | 15 | 0.5 | XX | XX | ⊚ |
| Example 3-1 | 85 | 15 | 1.1 | ○ | Δ | ⊚ |
| Example 3-2 | 85 | 15 | 3 | Δ | ⊚ | ⊚ |
| Example 3-3 | 85 | 15 | 5 | ⊚ | ⊚ | ⊚ |
| Example 3-4 | 85 | 15 | 8 | ⊚ | ⊚ | ⊚ |

What is claimed is:

1. A composite vehicle-interior finish material having high adhesive strength and excellent heat resistance, comprising the following three layers:

(A) a first layer formed of a polyvinyl chloride sheet or leather;
(B) a second layer formed by impregnating or coating a soft foam with a vinylidene chloride-based copolymer latex composed of 64–95 wt. % of vinylidene chloride monomer, 4–35 wt. % of at least one vinyl monomer other than vinylidene chloride monomer and 1–10 wt. % of an unsaturated organic acid monomer and then drying the soft foam; and
(C) a third layer formed by coating a base material with the vinylidene chloride-based copolymer latex and then drying the base material; and
said first, second and third layers having been bonded together by high-frequency welding.

2. The composite vehicle-interior finish material as claimed in claim 1, wherein the second layer (B) is a soft foam layer formed by impregnating or coating the soft foam with a vinylidene chloride-based copolymer latex composed of 70–92 wt. % of vinylidene chloride monomer, 8–25 wt. % of at least one vinyl monomer other than vinylidene chloride monomer and 2–8 wt. % of an unsaturated organic acid monomer and then drying said vinylidene chloride-based copolymer latex.

3. The composite vehicle-interior finish material as claimed in claim 1, wherein the thicknesses of the first, second and third layers are within ranges of 0.5–3 mm, 1–10 mm and 1–4 mm respectively.

4. A composite vehicle-interior finish material having high adhesive strength and excellent heat resistance, comprising the following three layers:

(A) a first layer formed of a polyvinyl chloride sheet or leather and having a thickness of 0.5–3 mm;
(B) a second layer formed by impregnating or coating a soft foam, at a rate of 10–30 g-resin per liter of soft foam, with a vinylidene chloride-based copolymer latex composed of 64–95 wt. % of vinylidene chloride monomer, 4–35 wt. % of at least one vinyl monomer other than vinylidene chloride monomer and 1–10 wt. % of an unsaturated organic acid monomer and then drying the soft foam, said second layer having a thickness of 1–10 mm; and
(C) a third layer formed by coating a base material, at a rate of 50–200 g-resin per m² of the base material, with the vinylidene chloride-based copolymer latex and then drying the base material, said third layer having a thickness of 1–4 mm; and
said first, second and third layers having been bonded together by a high-frequency welding.

* * * * *